United States Patent [19]

Schwammle

[11] Patent Number: 5,282,529
[45] Date of Patent: Feb. 1, 1994

[54] PALLET GUIDANCE STRUCTURE FOR OVER AND UNDER CONVEYOR

[75] Inventor: Kurt W. Schwammle, Bloomfield Hills, Mich.

[73] Assignee: Durr Automation, Inc., Davisburg, Mich.

[21] Appl. No.: 938,848

[22] Filed: Sep. 1, 1992

[51] Int. Cl.⁵ .............................................. B65G 37/00
[52] U.S. Cl. ................................ 198/465.3; 198/792; 198/803.2
[58] Field of Search ............... 198/465.1, 465.3, 803.2, 198/792

[56] References Cited

U.S. PATENT DOCUMENTS

| Re. 33,811 | 2/1992 | Miller | 198/465.3 X |
|---|---|---|---|
| 4,088,220 | 5/1978 | Jacksch et al. | 198/465.3 X |
| 4,442,935 | 4/1984 | Gregg | 198/465.3 |
| 4,776,453 | 10/1988 | Miller | 198/465.3 X |
| 4,896,763 | 1/1990 | Hordyk et al. | 198/465.3 X |
| 4,934,515 | 6/1990 | Linden | 198/803.2 |
| 5,029,691 | 7/1991 | Fein et al. | 198/465.3 X |
| 5,070,996 | 12/1991 | Schwaemmle et al. | 198/465.3 |
| 5,178,261 | 1/1993 | Matheson et al. | 198/465.3 X |

FOREIGN PATENT DOCUMENTS

| 0462878 | 12/1991 | European Pat. Off. | 198/465.1 |
|---|---|---|---|
| 2178713 | 2/1987 | United Kingdom | 198/803.2 |

Primary Examiner—Cheryl L. Gastineau

[57] ABSTRACT

An improved chain conveyor includes drive sprockets for the chain, and second sprockets for guiding the pallets between the upper and lower runs. The second sprockets rotate at a different rate of speed than the drive sprockets to adjust for misalignment between the pallet and the second sprocket as the pallet approaches the turns. The pallet includes an alignment groove which connects onto a link on the chain to properly position the pallet relative to the chain, and a plurality of teeth which are then engaged by the second sprocket. The second sprocket and the alignment groove thus provide plural positive engagement points between the pallet and the conveyor as the pallet moves between the upper and lower runs. This is an improvement over prior art systems which relied on frictional contact for such turning. In a further feature of the present invention, the chain and pallet are dimensioned such that the pallet is unlikely to jam as it is being turned.

10 Claims, 4 Drawing Sheets

PALLET GUIDANCE STRUCTURE FOR OVER AND UNDER CONVEYOR

BACKGROUND OF THE INVENTION

This application relates to an improved pallet for use with an over and under conveyor, wherein there is structure on the pallet and conveyor to positively drive the pallet between upper and lower runs.

Conveyors are known wherein a pallet moves frictionally along a pair of spaced endless members. The pallet runs along an upper run, where it typically carries a part, from one end of a conveyor path to the other. At the end of the conveyor path the pallet is turned from the upper run to a lower run where it is returned to its origination point. At the end of the lower run, the pallet is again turned back up to the upper run. In such systems the pallets typically move with the endless member through frictional contact. The pallets typically rest on the endless members on both the upper and lower runs, and move with the endless members, which are driven. In the prior art there has been some difficulties, however, turning the pallets between the upper and lower runs.

In one prior art system the pallet has chamfered surfaces at each end of a lower run support surface. These chamfered surfaces are intended to provide contact between the endless members and the pallet while the pallet is being turned between the upper and lower runs. Such systems do not have any actual positive engagement between the pallet and the endless member, however, instead they rely upon frictional contact. As the chain loosens, or as the pallet begins to wear, the adequacy of this frictional contact decreases. Thus, with such prior art systems, pallets may sometimes not turn properly between the upper and lower runs. This is undesirable.

SUMMARY OF THE INVENTION

It is an object of the present invention to provide a conveyor wherein a pallet is positively driven between the upper and lower runs. Further, it is an object of the present invention to disclose such a conveyor wherein each of the drive sprockets for the endless members are associated with a second sprocket that positively drives the pallet between the upper and lower runs. Preferably, the teeth on the second sprockets rotate at a different speed than the teeth on the drive sprockets.

The pallet is preferably formed with a plurality of teeth which engage the second sprocket such that the pallet is positively driven between the upper and lower runs. Since the second sprocket teeth rotate at a different rate than the first sprocket teeth, any pallet misalignment with the teeth on the second sprocket is corrected. The pallet moves with the endless member, which moves at the same rate as the drive sprocket teeth. The difference in the rate of speed between the second sprocket and the drive sprocket ensures that the pallet will eventually become aligned and engaged with the second sprocket. In a most preferred embodiment, the second sprocket rotates with the first sprocket but is of a smaller radius. Thus, the rotational speed of the second sprocket teeth will be less than that of the teeth on the larger drive sprocket, hence producing the difference in speed discussed above.

In a further feature of the present invention, the endless member is a chain, and an alignment groove is formed on the pallet. The alignment groove is positioned such that it catches on links on the chain, properly positioning the pallet relative to the chain such that the teeth on the pallet will be properly aligned with the teeth on the second sprocket. With the inventive conveyor, there is positive contact between the pallet and the chain once a link on the chain engages the alignment groove. Further, there is positive engagement between the second sprocket and the teeth on the pallet as the second sprocket turns the pallet between the upper and lower runs.

In a second embodiment of the present invention, the links on the chains are spaced by a sufficient distance such that the lower run contact surface on the pallet has outer axial ends which are received in two spaced openings between spaced links when the pallet extends directly vertically as it is moved between the upper and lower runs. In a most preferred embodiment, the spacing between adjacent links is selected such that it is greater than or equal to the difference of the length of the arc extending between the center lines of the two spaced openings, minus the length of that lower run contact surface. With such a relationship, it is ensured that the lower run contact surface will not jam into links in that position, but rather will be smoothly and positively guided between the upper and lower runs.

These and other features of the present invention can be best understood from the following specification and drawings, of which the following is a brief description.

DETAILED DESCRIPTION OF A PREFERRED EMBODIMENT

Figure 1:
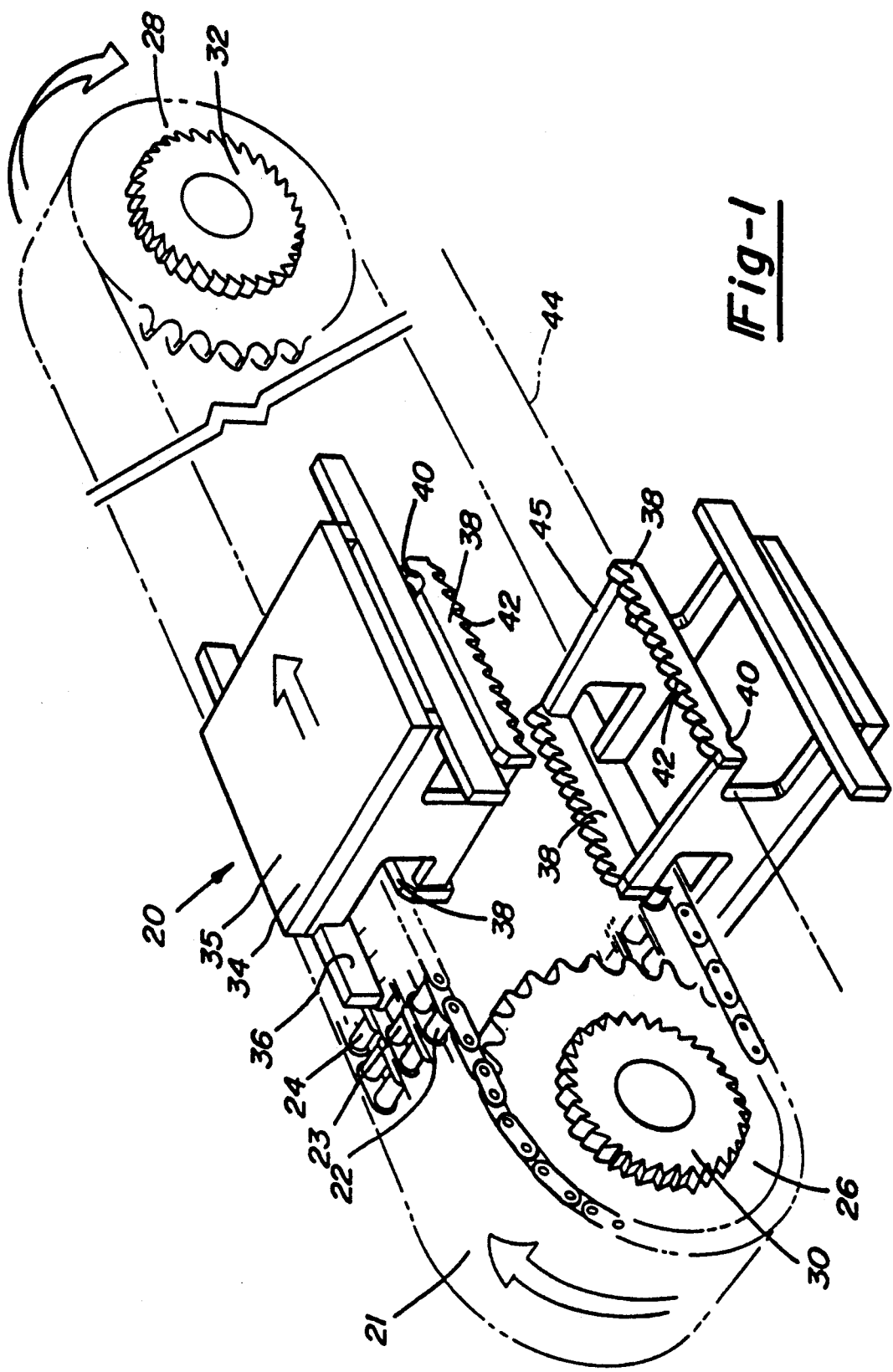
FIG. 1 is a partially schematic perspective view of an inventive conveyor system.

FIG. 1 shows a conveyor system 20 incorporating a chain 21 which may have three links 22, 23, 24. A first drive sprocket 26 is positioned at one axial end, and drives chain 21 along a path to a second drive sprocket 28 positioned at the opposed end of the conveyor. A second sprocket 30 is associated with first sprocket 26, but is of a smaller radial dimension. Preferably, second sprocket 30 rotates with drive sprocket 26. Similarly, second sprocket 32 rotates with sprocket 28.

As is known in the art, a conveyor 34 having a work supporting surface 35 moves on chain 21 as it is driven between drive sprockets 26 and 28. As shown, an upper run contact surface 36 frictionally engages chain 21 such that pallet 34 moves with chain 21 through frictional engagement.

A lower run contact surface 38 supports pallet 34 on an inner side of chain 21 as the pallet moves along a lower run, from second drive sprocket 28 back towards first drive sprocket 26. In a feature of the present invention, alignment groove 40 and a plurality of teeth 42 are formed on opposed sides of the lower run contact surfaces 38.

As is well known in the art, a second chain 44, similar to chain 21, is positioned at the opposed lateral side of pallet 34. Sprockets similar to sprockets 26, 28, 30 and 32 are associated with second chain 44. As is shown, pallets 34 also have a second set of teeth and alignment grooves on a second lower run contact surface.

A pallet 34 is shown moving on a lower run at 45. A pallet 34 on an upper run approaches sprocket 28, is turned around sprocket 28 and onto lower run 45. The pallet is frictionally engaged with the chains 21 and 44 and moves along lower run 45 back to sprocket 26. Sprocket 26 turns pallet 34 back up to the upper run. The cycle is then repeated.

Figure 2:
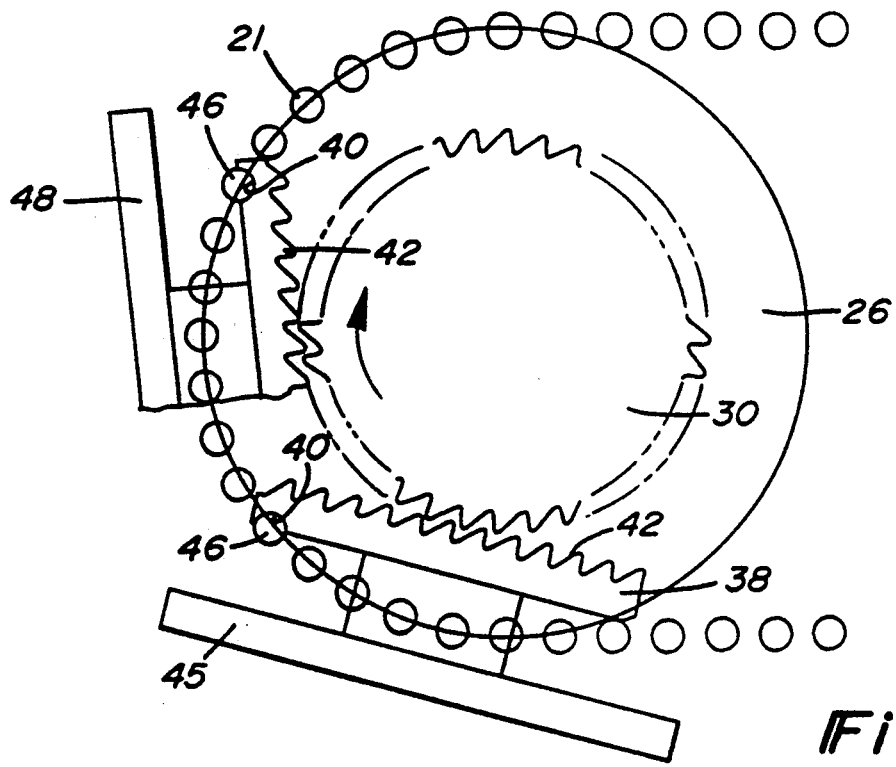
FIG. 2 is a cross-sectional view showing the movement of a pallet from the lower run to the upper run.

As shown in FIG. 2, as pallet 34 moves along the lower run 45, alignment groove 40 eventually is caught on a chain link 46. Chain link 46 then begins to provide positive engagement to turn pallet 45 around the axis of drive sprocket 26. As link 46 begins to turn around the axis of sprocket 26, teeth 42 on lower run contact 38 approach the teeth on the second sprocket 30. The link 46 and alignment groove 40 ensure that teeth 42 will be properly aligned with the teeth on second sprocket 30. Eventually, the teeth engage, and pallet 45 begins to be positively driven both by link 46, and by the second sprocket 30. As shown at 48, the pallet has moved to a position such that it is approximately half way to the upper run.

Figure 3:
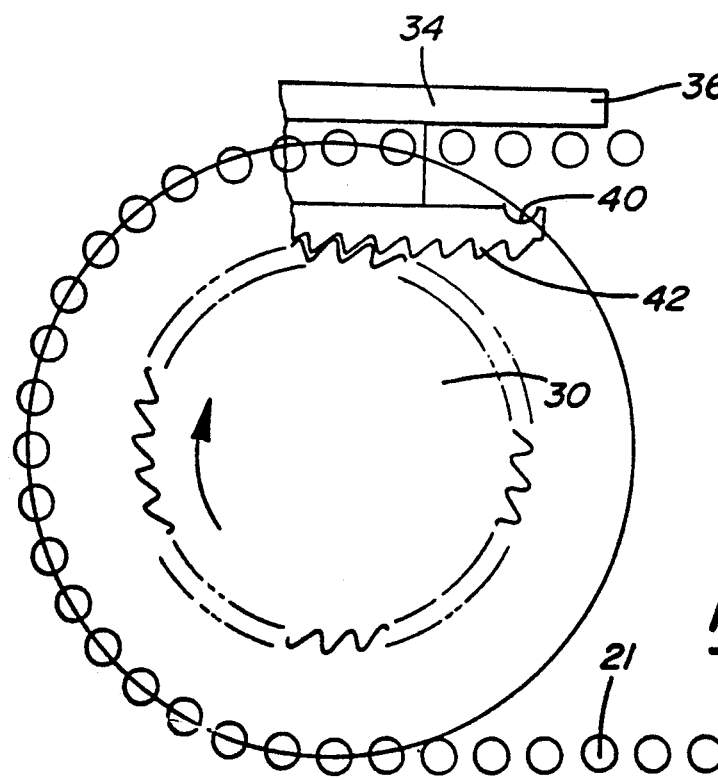
FIG. 3 shows a step subsequent to that shown in FIG. 2.

As shown in FIG. 3, as the pallet 34 begins to move onto the upper run, alignment groove 40 moves away from the chain links. Teeth 42 may still be engaged by the teeth on sprocket 30. Eventually, as pallet 34 moves along the upper run, teeth 42 move away from the teeth on second sprocket 30. Pallet 34 then falls until upper run contact members 36 again engage the chains.

Figure 4:
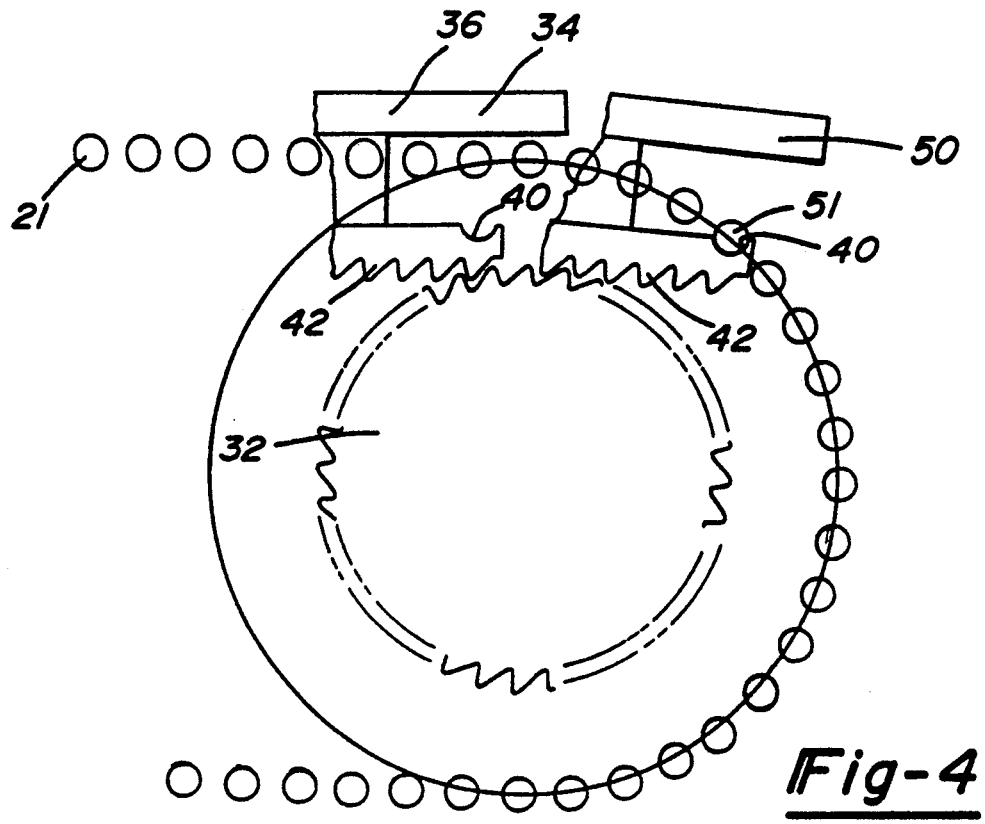
FIG. 4 is a view showing a pallet beginning movement from the upper run to the lower run.

As shown in FIG. 4, when pallet 34 approaches the end of its upper run, teeth 42 are engaged by the teeth on sprocket 32. Alignment groove 40 is initially spaced from the chain links at this position. Sprocket 32 engages teeth 42 and begins to drive pallet 34 to the position shown at 50. In the position shown at 50, alignment groove 40 engages a chain link 51. The combination of the chain link 51 and the teeth on second sprocket 32 positively drive pallet 34 to turn from the upper run to the lower run.

Figure 5:
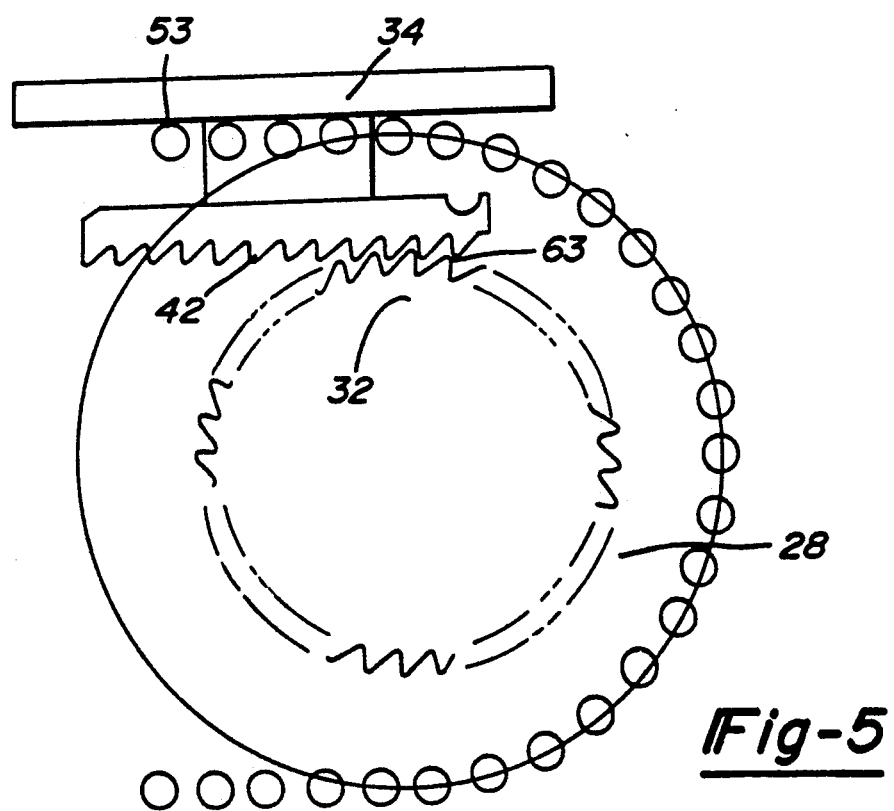
FIG. 5 shows a feature of the movement of a pallet from the upper run to the lower run.

As shown in FIG. 5, should teeth 42 be initially misaligned with the teeth on second sprocket 32, pallet 34 will pivot about a pivot point 53. Second sprocket 32 is rotating at a different speed than sprocket 28, and consequently the chain and pallet also move at a different rate from second sprocket 32. Teeth on second sprocket 32 will eventually move from the contact position 63 shown in FIG. 5 to a position where teeth 42 on pallet 34 are aligned with teeth on sprocket 32. At that point the engagement illustrated in FIG. 4 will occur. The different rate of speed between the sprocket thus provide an easy method of aligning the pallet and second sprocket.

To improve the pivoting ability, the lower run contact 38 may be offset forwardly, or to the right as shown in FIG. 5, relative to upper run contact member 36. This will increase the length of the lever arm causing this pivoting, and reduce the required force.

Figure 6:
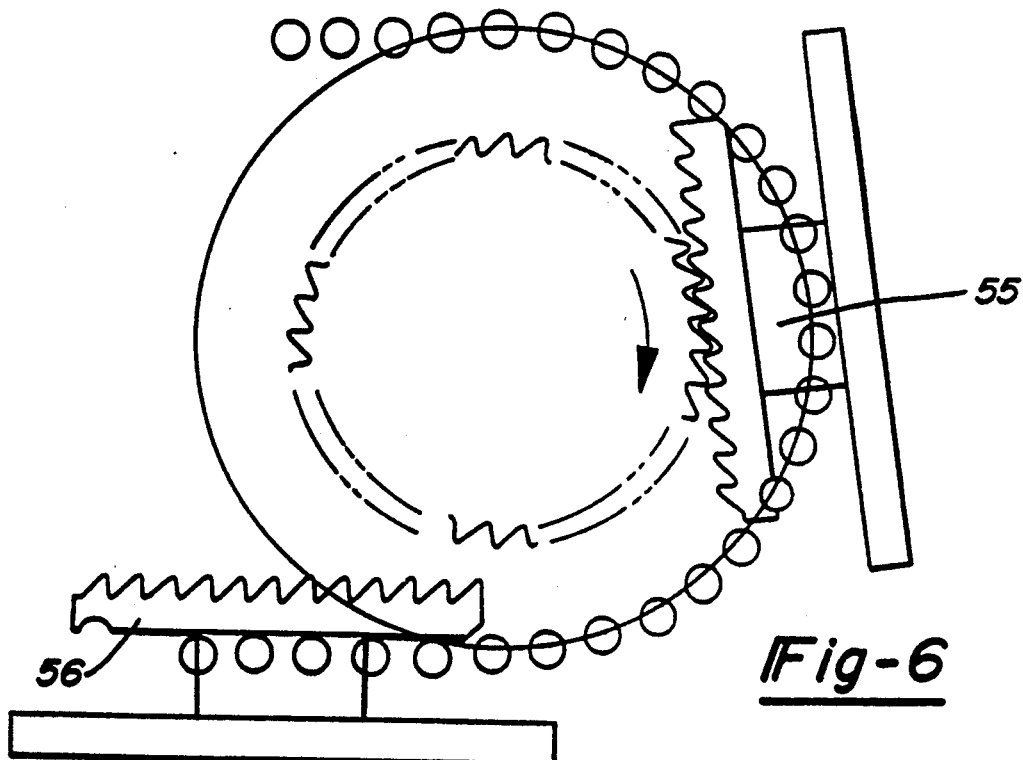
FIG. 6 shows a step subsequent to that shown in FIG. 4.

As shown at 55 in FIG. 6, pallet 34 has begun to turn to the lower run. In the position shown, the pallet is at a position wherein it extends directly vertically. As shown as 56, the pallet is eventually turned onto the lower run, and it falls back onto the chain.

Figure 7:
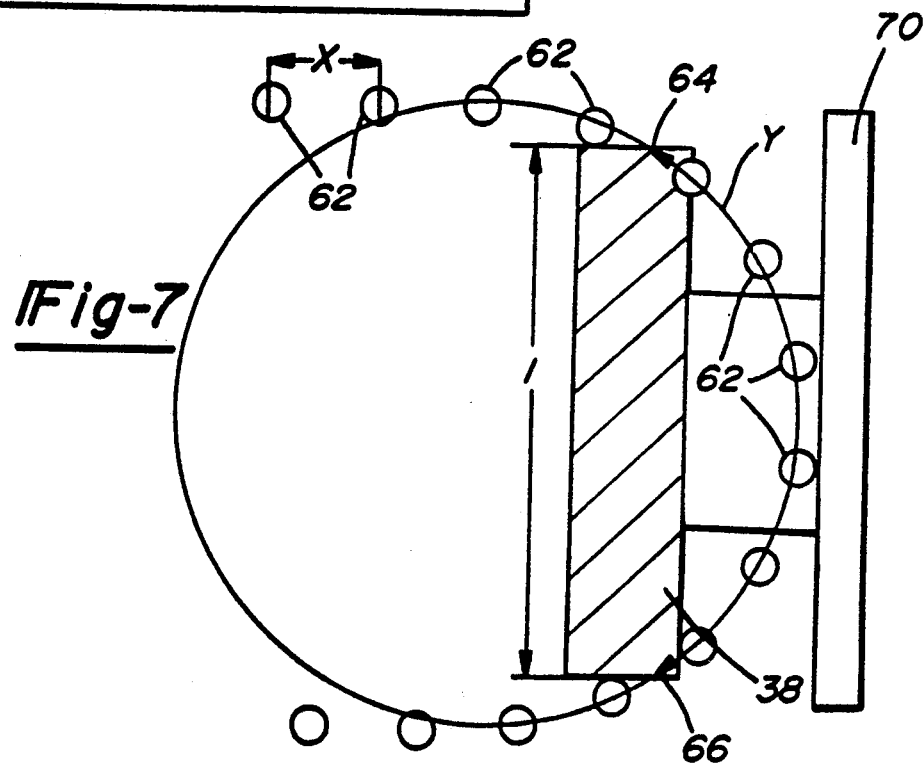
FIG. 7 is a view showing dimensional details of a second embodiment inventive conveyor system.

A further embodiment is shown in FIG. 7. The lower run contact surface and the chain links are dimensioned such that lower run contact surface 38 has axial ends 64 and 66 extending into two spaced openings between spaced chain links 62, when the lower run contact surfaces 38 is at a position where it extends directly vertically. This ensures positive guidance of the pallet, and prevents any undesirable jamming of the pallet with the chain. As shown, when the pallet is in this position the upper run contact surfaces 70 are spaced from the chain links. There is thus clearance allowing the pallet to adjust relative to the chain as it turns, preventing jamming. Lower run contact surface 38 is shown schematically in this figure, and could include teeth and an alignment groove as disclosed above.

The dimensioning of the chain and pallet to achieve this positioning may be determined by spacing adjacent chain links 62 by a distance X. The distance X is determined from a formula including the length 1, which is the length of lower run contact member 38 between ends 64 and 66, and the distance Y, wherein Y is the actual length of the arc between the center lines of the two spaced openings between adjacent links 62 wherein 64 and 66 are received. Distance X should be greater than or equal to $Y-1$.

Further, it is envisioned that a second alignment groove may be positioned at the opposed end of the lower run contact member. This will guide the pallet for an additional period over the one alignment groove system. The pallet will guide back onto the chain, rather than falling as it leaves the turn.

Preferred embodiments of the present invention have been disclosed. It should be understood, however, that a worker of ordinary skill in the art would recognize that certain modifications would come within the scope of this invention. For that reason, the following claims should be studied in order to determine the true scope and content of this invention.

I claim:

1. A conveyor system comprising:
a first pair of spaced sprockets, with at least one of said first pair of sprockets being driven, and an endless member rotating with said first pair of sprockets and extending around said first pair of sprockets to define a conveyor path, said first pair of sprockets defining respective ends of said conveyor path;

at least one pallet movable on said endless member along an upper run between said ends, turning at a first end of said conveyor path onto a lower run, moving along said lower run to a second end then being turned back onto the upper run;

said at least one pallet being positively driven between the upper and lower runs by a second sprocket associated with each of said first pair of sprockets, the outer periphery of said second sprocket rotating at a different rate of speed than the outer periphery of said first pair of sprockets; and said endless member being a chain, and said at least one pallet having a lower run contact surface which is supported on an inner surface of said chain as said pallet moves along said lower run, an alignment groove formed on said lower run contact surface, said alignment groove engaging a link of said chain as said pallet is being moved from the upper run to the lower run.

2. The conveyor as recited in claim 1, wherein said second sprockets rotate slower than said first pair of sprockets.

3. A conveyor as recited in claim 2, wherein said second sprockets rotate with said first pair of sprockets but have a smaller radial dimension such that the rotational velocity of their outer peripheries is less than that of said first pair of sprockets.

4. A conveyor as recited in claim 1, wherein said pallet having a plurality of teeth on an opposed side of said lower run contact surface from said alignment groove, said plurality of teeth being engaged by said second sprockets as said at least one pallet turns between the upper and lower runs.

5. A conveyor as recited in claim 1, wherein said endless member is a chain, said sprockets rotating about a horizontal axis and the distance between links of said chain is sufficient such that a lower run contact surface of said pallet extends into two spaced openings between adjacent ones of said links when said pallet is at a position such that it extends directly vertically.

6. The conveyor as recited in claim 5, wherein the distance between adjacent links is selected such that it is greater than or equal to the difference between the length of an arc measured between centers of said two spaced openings minus the length of said lower run contact surface.

7. A pallet for use on a chain conveyor comprising:
an upper run contact surface;
a lower run contact surface spaced from said upper run contact surface;
an alignment groove formed on said lower run contact surface on a side facing said upper run contact surface and adapted to engage a link of a chain being driven by a first sprocket; and
a plurality of teeth formed on said lower run contact surface on the opposed side from said alignment groove, said alignment groove being positioned such that when a link is received in said alignment groove, said teeth are aligned with teeth on a second sprocket for the conveyor that said pallet is to be utilized with.

8. A conveyor system comprising:
a pair of spaced drive sprockets, at least one chain extending around said pair of spaced drive sprockets, said chain having a plurality of links spaced from each other by a first distance;
a pallet positioned on said chain, said pallet having an upper run contact surface for contacting said chain and with said pallet adapted for moving along said chain on an upper run from a first of said drive sprockets to a second of said drive sprockets, said second drive sprocket adapted for turning said pallet from said upper run to a lower run, a lower run contact surface formed on said pallet for supporting said pallet on an inner face of said chain, with said pallet moving along a lower run from said second drive sprocket back to said first drive sprocket, said first drive sprocket turning said pallet from said lower run back to said upper run, said lower run contact surface also including an alignment groove on a side facing said upper run contact surface, said alignment groove being received on one of said links as said pallet is turned from said upper run to said lower run; and
said first distance being selected such that said lower run contact surface having axial ends which extend into two spaced openings between adjacent ones of said links when said lower run contact surface extends directly vertically.

9. A conveyor as recited in claim 8, wherein said first distance being selected such that it is greater than or equal to the difference between the length of an arc measured between the center lines of said two spaced openings minus the length of said lower run contact surface between said two axial ends.

10. A conveyor as recited in claim 8, wherein said upper run contact surface is spaced away from said chain when said lower run contact surface is in said position such that it extends directly vertically.

* * * * *